W. M. STEHLEY.
HARROWS AND LAND ROLLERS COMBINED.

No. 186,506.     Patented Jan. 23, 1877.

Witnesses
Wm Robinson
Wm V. Coxton

Inventor
William M. Stehley

UNITED STATES PATENT OFFICE.

WILLIAM M. STEHLEY, OF KING WILLIAM COURT-HOUSE, VIRGINIA.

IMPROVEMENT IN HARROW AND LAND-ROLLER COMBINED.

Specification forming part of Letters Patent No. 186,506, dated January 23, 1877; application filed August 17, 1876.

*To all whom it may concern:*

Be it known that I, WILLIAM M. STEHLEY, of King William Court-House, county of King William and State of Virginia, have invented an Improvement in Harrows and Land-Rollers Combined, of which the following is a full, clear, and accurate description of the construction and operation of the same, so as to enable one skilled in the art to which it pertains to make the same, reference being had to the accompanying drawing, making a part of this specification, in which—

Figure 1:
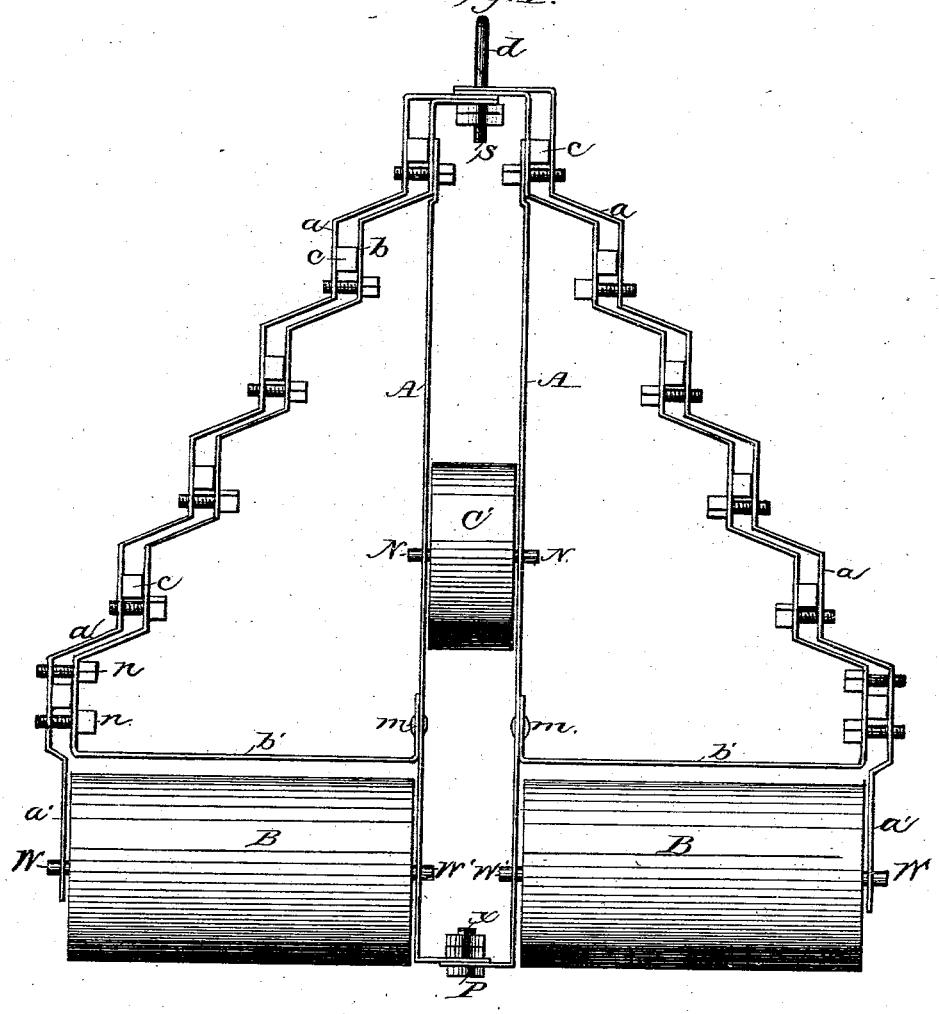
Figure 2:
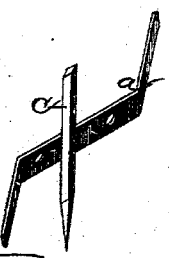

Figure 1 represents a top view of the harrow and rollers, with the teeth set vertical. Fig. 2 is a sectional view, representing a part of the harrow-frame with a tooth shown in an oblique position relative to said frame.

My improvement has several objects in view: first, to provide a tooth-holding frame in form of a clamp, consisting of two parts, preferably of band-irons applied vertically to each other, and combined with each other by bolts, the teeth being held between the parts of the clamp by compression from the bolts, and are adjustable for difference of depth of stroke as a cutting or tearing harrow, when the teeth are set vertically, or as a smoothing-harrow when the teeth are set slanting backward, all of which adjustments are effected by slackening and tightening the bolts; second, in making the sides of the harrow zigzag or step form, to serve as a kind of clod-saw, and to secure the proper pitch of slots between the parts of the clamp-plates to enable the teeth to be set to slant duly backward, and in a series of rollers combined with the harrow-frames in a novel and simple manner.

I construct my harrow in the form of a triangle, or rather two triangular forms, having the longitudinal bars A A at the harrow middle adapted to brace the sections, to hinge them together, and to admit the roller C' between them, mounted on the axis N N, as shown.

The hinge consists of swivel $d\ s$ at the front, $d$ serving as a draft-bolt, with an eye for a clevis, and the nut S engaging the side frames, as shown, and a similar swivel at P X at the rear end, which, in connection with the front swivel, serves to allow the side frames to be more or less raised or lowered, according to the inequality of the surface of the ground traveled over.

To construct the side frames $a\ a'\ b\ b'$, I use ordinary band-iron, about two inches wide by about three-eighths of an inch thick. The piece, if long enough, may be bent, or returned upon itself, or two pieces may be welded together at one of their ends. The double iron is then bent into the zigzag lines $a$ and $b$, as shown, making alternately a rearward and then an oblique sideward detour, so that the sides are not unlike saw-teeth, which are sufficiently slanted rearward to enable the harrow to free itself from any firm obstacle, as a tree, stump, or rock, but which are calculated to break or cut clods which might otherwise escape the action of the harrow-teeth. The side frames are further extended as follows: The outer one, $a'$, of the pair composing each side frame, is extended to receive through them the journals W W of the rollers B, and the inner one, $b'$, of the pair is extended to form a scraper for the roller B, and is joined at $m$ to the longitudinal bar A. The inner ends of the rollers B are supported on the journals W' W', which have their bearings in the longitudinal bars A A, as shown.

The pairs of bars $a\ b$, when bent, are then drilled for the admission of bolts. The inner bar $b$ has the holes drilled large enough to pass the bolts $n$ freely through them, and the bars $a$ are tapped to engage the said bolts $n$, which are made square-headed, and to be operated by a wrench. The opposite plan of insertion may, however, be employed—namely, the bolts may be inserted from the outside, and may be provided with nuts on the inside of the harrow. In either case the outside of the frames must be free from projecting bolt ends. The bolts $n$ may also be arranged in pairs—that is, one bolt on each side of a harrow-tooth, but not so close to the tooth as to prevent slanting the tooth $c$, as shown in Fig. 2. The teeth $c$ are inserted between the bars $a\ b$, and are clamped in position by the bolts $n$. It is plain the teeth $c$ may be set to cut shallow or deeply, as desired; also, that they may be set slanting, as shown in Fig. 2, to form a smoothing-harrow.

If the teeth are to be sharpened, they can be readily detached by slacking up the bolts.

The advantages of my harrow and roller combined are, the frame is almost indestructible. The teeth may be made of steel, and consequently may be made to last a lifetime. The harrow may also be stowed away in a small space, as its sections may be separated.

It is also either a smoothing-harrow for sowing grass-seed, and a deep cutting-harrow, or a shallow harrow, as the nature of the work may require the teeth to be adjusted. Moreover, it is a good land-roller, and may be easily made a sulky-harrow by adding a seat to the rear of roller C'.

Having thus fully and clearly described my improvement, what I regard as new and useful, and desire to secure by Letters Patent of the United States, is—

1. The hinged harrow $a b a' b'$ A, constructed with zigzag or shearing sides $a b$, made with lateral offsets in clamp form, in which are supported the bar-teeth C, in erect or inclined position, by the bolts $n$, to form the adjustable cutting or smoothing harrow, substantially as set forth.

2. The scraper or roller cleaner $b'$, in combination with the roller B, and with the parts A and $a b$ of the harrow-frame constructed and arranged substantially as set forth.

3. The hinged side frames $a b a' b'$ A, in combination with the rolls B at rear end, and with roll C' in interior of harrow, all arranged substantially as set forth.

In testimony that I claim the foregoing as my invention, I have hereunto set my hand this 29th day of July, 1876.

WILLIAM M. STEHLEY.

Witnesses:
  THOS. ROBINSON,
  WM. V. CROXTON.